United States Patent
Watanabe et al.

(10) Patent No.: US 10,741,978 B2
(45) Date of Patent: Aug. 11, 2020

(54) WIRE HARNESS

(71) Applicant: Yazaki Corporation, Minato-ku, Tokyo (JP)

(72) Inventors: Jin Watanabe, Makinohara (JP); Naoyuki Yoshida, Makinohara (JP); Shouya Shinogaya, Makinohara (JP)

(73) Assignee: Yazaki Corporation, Minato-ku, Tokyo (JP)

( * ) Notice: Subject to any disclaimer, the term of this patent is extended or adjusted under 35 U.S.C. 154(b) by 0 days.

(21) Appl. No.: 16/592,261

(22) Filed: Oct. 3, 2019

(65) Prior Publication Data
US 2020/0112130 A1   Apr. 9, 2020

(30) Foreign Application Priority Data

Oct. 3, 2018 (JP) .................................. 2018-188539

(51) Int. Cl.
| | | |
|---|---|---|
| *H01R 13/66* | (2006.01) | |
| *H01R 13/50* | (2006.01) | |
| *H01R 13/04* | (2006.01) | |
| *H01R 13/631* | (2006.01) | |

(52) U.S. Cl.
CPC .......... *H01R 13/665* (2013.01); *H01R 13/04* (2013.01); *H01R 13/50* (2013.01); *H01R 13/631* (2013.01); *H01R 2201/18* (2013.01)

(58) Field of Classification Search
CPC .................................................. H01R 13/665
See application file for complete search history.

(56) References Cited

U.S. PATENT DOCUMENTS

| | | | | |
|---|---|---|---|---|
| 6,291,770 | B1 * | 9/2001 | Casperson | B60R 16/0207 174/139 |
| 7,179,101 | B2 * | 2/2007 | Murakami | H01R 4/2433 439/142 |
| 7,485,982 | B2 * | 2/2009 | Hayes | B60R 16/0207 307/9.1 |
| 7,494,348 | B1 * | 2/2009 | Tyler | B60R 16/0215 439/76.2 |
| 7,999,408 | B2 * | 8/2011 | Fehr | B60R 16/0315 307/10.1 |
| 9,017,083 | B2 * | 4/2015 | Hayashi | H01R 13/648 439/108 |
| 9,457,741 | B2 * | 10/2016 | Sasaki | B60R 16/0207 |
| 9,640,955 | B2 * | 5/2017 | Kitamura | H01R 24/20 |

(Continued)

FOREIGN PATENT DOCUMENTS

JP   2015-230873 A   12/2015

*Primary Examiner* — Ross N Gushi
(74) *Attorney, Agent, or Firm* — Banner & Witcoff, Ltd.

(57) ABSTRACT

A wire harness includes at least two electrical wires, and a connection unit via which each of the at least two electrical wires are connected. The connection unit includes a circuit board connected to the at least two electrical wires, and a conductor member extending downward from the circuit board, the conductor member being electrically connected to a ground pattern on the circuit board. The connection unit is attached to a vehicle body in a state where the conductor member is in contact with a grounding conductor formed on the vehicle body when the connection unit is disposed on the vehicle body. Therefore, the circuit board can be directly connected to the ground via the conductor member only by disposing the connection unit on the vehicle body.

5 Claims, 5 Drawing Sheets

(56) References Cited

U.S. PATENT DOCUMENTS

| | | | |
|---|---|---|---|
| 10,017,135 B2* | 7/2018 | Tsukamoto | B60R 16/03 |
| 10,122,125 B2* | 11/2018 | Maki | H01R 13/6691 |
| 10,266,130 B2* | 4/2019 | Saito | H02G 3/16 |
| 10,367,270 B2* | 7/2019 | Breed | B60R 16/0207 |
| 10,457,229 B2* | 10/2019 | Tsukamoto | H02G 3/08 |
| 10,464,504 B2* | 11/2019 | Nakamura | B60R 16/0239 |
| 10,464,506 B2* | 11/2019 | Kiyosue | B60R 16/0215 |
| 10,522,267 B2* | 12/2019 | Sugimoto | B60R 16/023 |
| 10,525,906 B2* | 1/2020 | Tsukamoto | B60R 16/0207 |
| 10,576,916 B2* | 3/2020 | Takamatsu | B60R 16/03 |
| 2002/0180271 A1* | 12/2002 | Taniguchi | B60R 16/0207 307/10.1 |
| 2003/0070830 A1* | 4/2003 | Kondo | H01B 7/009 174/68.1 |
| 2004/0158413 A1* | 8/2004 | Matsuda | B60R 16/0207 702/33 |
| 2004/0227402 A1* | 11/2004 | Fehr | B60R 16/0315 307/10.1 |
| 2015/0349471 A1* | 12/2015 | Maki | B60R 16/0215 307/10.1 |
| 2015/0360627 A1* | 12/2015 | Sasaki | H01R 9/031 174/72 A |
| 2016/0059708 A1* | 3/2016 | Iwasaki | B60L 1/00 307/10.1 |
| 2017/0057434 A1 | 3/2017 | Nohara et al. | |
| 2018/0123301 A1* | 5/2018 | Tsukamoto | H01R 13/111 |
| 2018/0229677 A1* | 8/2018 | Specht | B60L 1/00 |
| 2018/0334113 A1* | 11/2018 | Saito | H02G 3/16 |
| 2018/0334117 A1* | 11/2018 | Matsunaga | B60R 16/0215 |
| 2019/0074641 A1* | 3/2019 | Maki | B60R 16/0215 |
| 2019/0118743 A1* | 4/2019 | Takamatsu | H02G 3/081 |
| 2019/0118744 A1* | 4/2019 | Takamatsu | H01R 13/64 |
| 2019/0123472 A1* | 4/2019 | Takamatsu | B60R 16/03 |
| 2019/0123480 A1* | 4/2019 | Takamatsu | H01R 13/64 |
| 2019/0123920 A1* | 4/2019 | Takamatsu | H02G 3/081 |
| 2019/0126860 A1* | 5/2019 | Takamatsu | B60R 16/0215 |
| 2019/0126862 A1* | 5/2019 | Sasaki | B60R 16/03 |
| 2019/0126863 A1* | 5/2019 | Naganishi | B60L 1/00 |
| 2019/0126865 A1* | 5/2019 | Takamatsu | B60R 16/0215 |
| 2019/0168693 A1* | 6/2019 | Nakamura | B60R 16/0215 |
| 2019/0344731 A1* | 11/2019 | Enomoto | B60R 16/023 |
| 2020/0101909 A1* | 4/2020 | Watanabe | B60R 16/0207 |
| 2020/0101911 A1* | 4/2020 | Watanabe | H01R 13/73 |
| 2020/0106207 A1* | 4/2020 | Watanabe | H01R 13/514 |
| 2020/0112130 A1* | 4/2020 | Watanabe | H01R 13/50 |
| 2020/0113070 A1* | 4/2020 | Watanabe | H01R 25/006 |

* cited by examiner

Direction of vehicle

WIRE HARNESS

CROSS-REFERENCE TO RELATED APPLICATIONS

This application is based on and claims priority under 35 USC 119 from Japanese Patent Application No. 2018-188539 filed on Oct. 3, 2018, the contents of which are incorporated herein by reference.

TECHNICAL FIELD

The present disclosure relates to a wire harness including a plurality of electrical wires and a connection unit via which the plurality of electrical wires are connected.

BACKGROUND ART

A wire harness mounted on a vehicle such as an automobile is generally configured as an assembly obtained by bundling, for example, a plurality of sub-harnesses respectively prepared for each system. The sub-harnesses to be bundled are prepared according to various required specifications of the wire harness.

Specifically, there are a wide variety of electrical components to be mounted on vehicles corresponding to vehicle types, vehicle grades, and optional equipment (a sound system, a power window system, etc.) selected according to a demand of a vehicle customer (driver). Therefore, electrical wires or the like constituting a power supply line, a ground line, a signal line, and a communication line connected to the wide variety of electrical components are different. In order to cope with such differences in electrical wires, a bundle of electrical wires to be mounted standardly (standard electrical wire) is provided as a standard sub-harness for operating each of drive systems per drive system such as an engine and a motor. Further, in order to operate optional equipment or the like to be selectively mounted, a bundle of electrical wires to be mounted selectively and additionally (optional electrical wires) is provided as an optional sub-harness.

In recent years, application of Information Technology (IT) to vehicles such as automatic driving technology and external environment detection technology is rapidly advancing, and both standard electrical wires and optional electrical wires are tending to increase with the introduction of IT. That is, the number of types (kind) of sub-harnesses which is required to be prepared in advance has increased significantly when a wire harness is mounted on a vehicle.

Therefore, in order to prevent the increase in the number of types of sub-harnesses, it is known to construct a wire harness with a circuit substrate and a plurality of sub-harnesses by connecting the plurality of sub-harnesses to the circuit substrate and connecting the electrical wires of the sub-harnesses through a circuit pattern on the circuit substrate (see, for example, JP 2015-230873 A). In this wire harness, a circuit such as a branch can be provided in the circuit board for both the standard sub-harness and the optional sub-harness.

In the wire harness of JP 2015-230873 A, it is not necessary to provide a branch to both the standard sub-harness and the optional sub-harness by using the circuit board. Therefore, a shape of the sub-harness is simplified without branches and the entire system can be standardized.

Tastes and hobbies for each vehicle customer are extremely detailed and are more and more diverse. The increase in optional electrical wires to be selectively added depending on the type and grade of a predetermined vehicle may be significant. Therefore, a demand for standardizing only the optional sub-harnesses configured with optional electrical wires and reducing the number of types thereof is also expected in the future.

In order to meet such a demand, a large number of connection units for accommodating the circuit board described above are prepared to actively utilize the circuit board. Here, when the connection unit is disposed on a vehicle body, the circuit board of the connection unit is required to be connected to a grounding conductor formed on the vehicle body. However, when a large number of connection units including a circuit board are required to be disposed, work of disposing the connection units may be complicated.

SUMMARY OF INVENTION

The present disclosure is to provide a wire harness by which the work of connecting the circuit board to the ground can be simplified and the assembling efficiency of the wire harness can be improved.

According to an aspect of the present disclosure, a wire harness includes at least two electrical wires, and a connection unit via which each of the at least two electrical wires are connected. The connection unit includes a circuit board connected to the at least two electrical wires, and a conductor member extending downward from the circuit board, the conductor member being electrically connected to a ground pattern on the circuit board. The connection unit is attached to a vehicle body in a state where the conductor member is in contact with a grounding conductor formed on the vehicle body when the connection unit is disposed on the vehicle body.

According to the aspect of the present disclosure, the conductor member extending downward from the circuit board is provided at the connection unit, and is in contact with and electrically connected to the grounding conductor of the vehicle body when the connection unit is disposed on the vehicle body. As a result, the circuit board can be directly connected to the ground as it is via the conductor member only by disposing the connection unit on the vehicle body. Accordingly, even when a large number of connection units including a circuit board are required to be disposed, the work of connecting the circuit board to the ground can be simplified and the assembling efficiency of the wire harness can be improved.

The present disclosure has been briefly described as above. Further, details of the present disclosure are further clarified by reading a mode for carrying out the present disclosure described below (hereinafter, referred to as "embodiment") with reference to the accompanying drawings.

DESCRIPTION OF EMBODIMENTS

Specific embodiments of a wire harness of the present disclosure will be described below with reference to the drawings.

Figure 1:
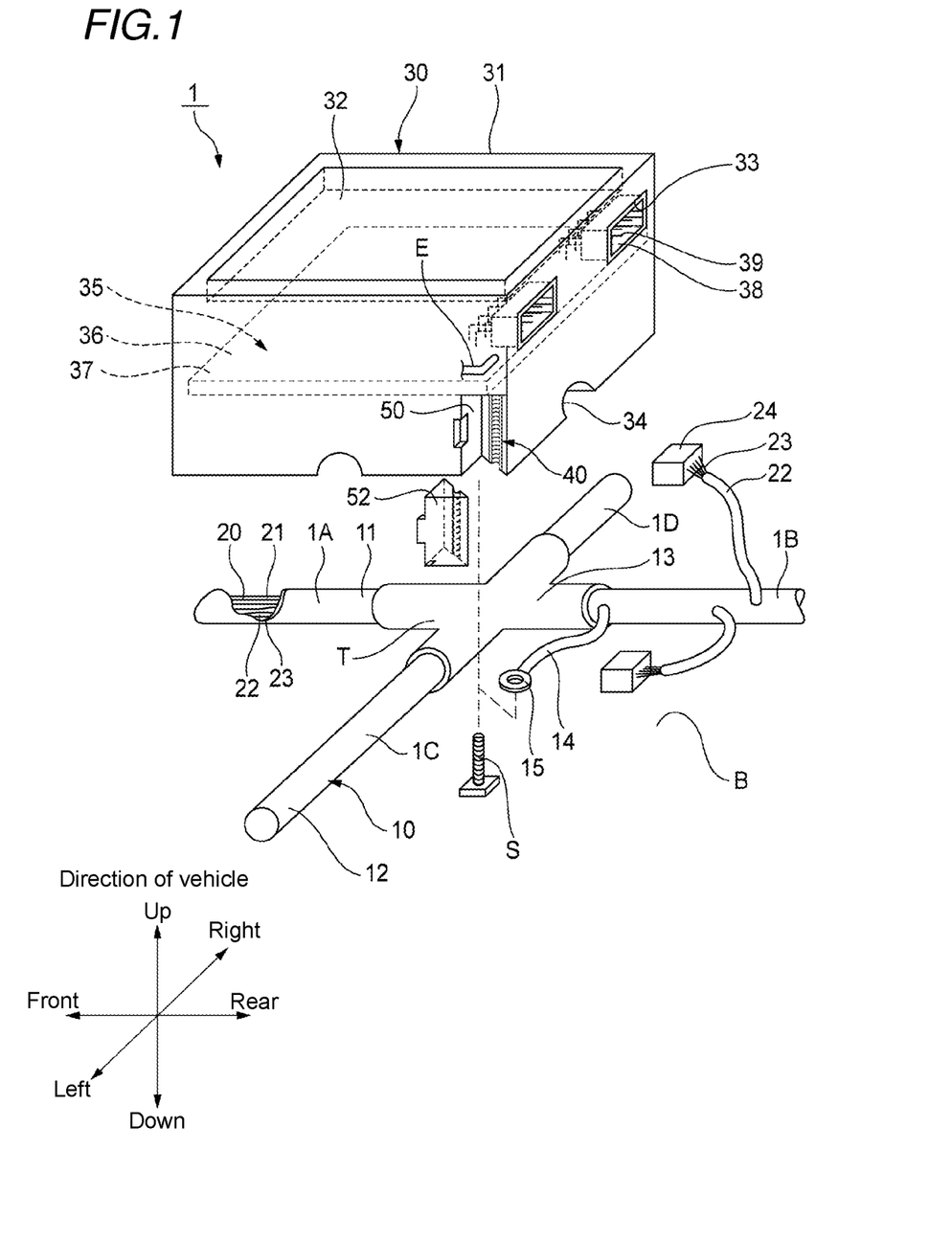
FIG. 1 is an exploded perspective view illustrating main parts of a wire harness according to an embodiment of the present disclosure.
Figure 2:
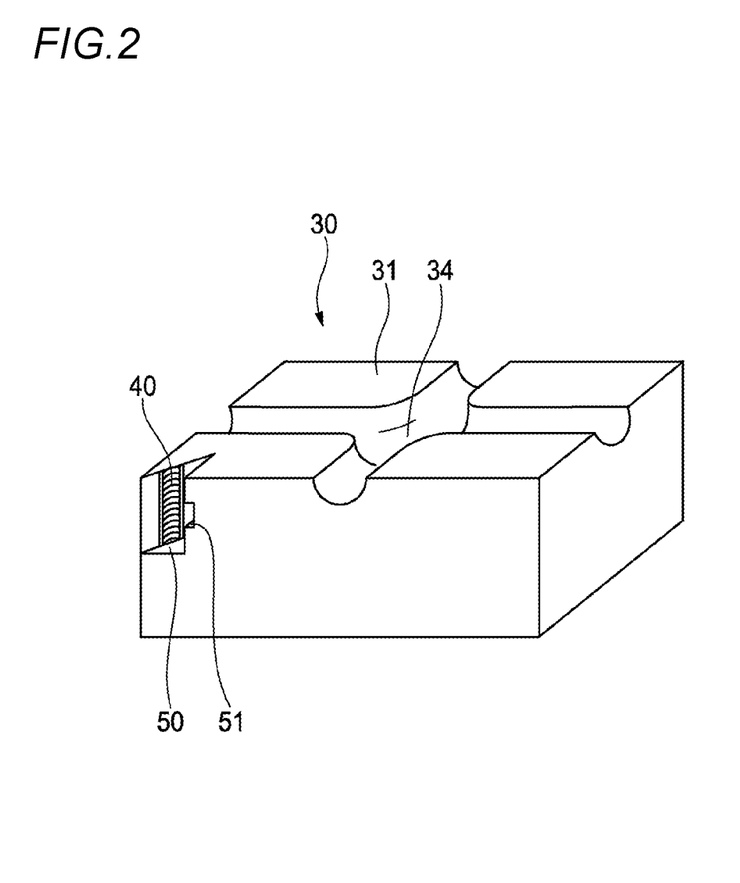
FIG. 2 is a perspective view illustrating a state where a connection unit in FIG. 1 is turned upside down.
Figure 3:
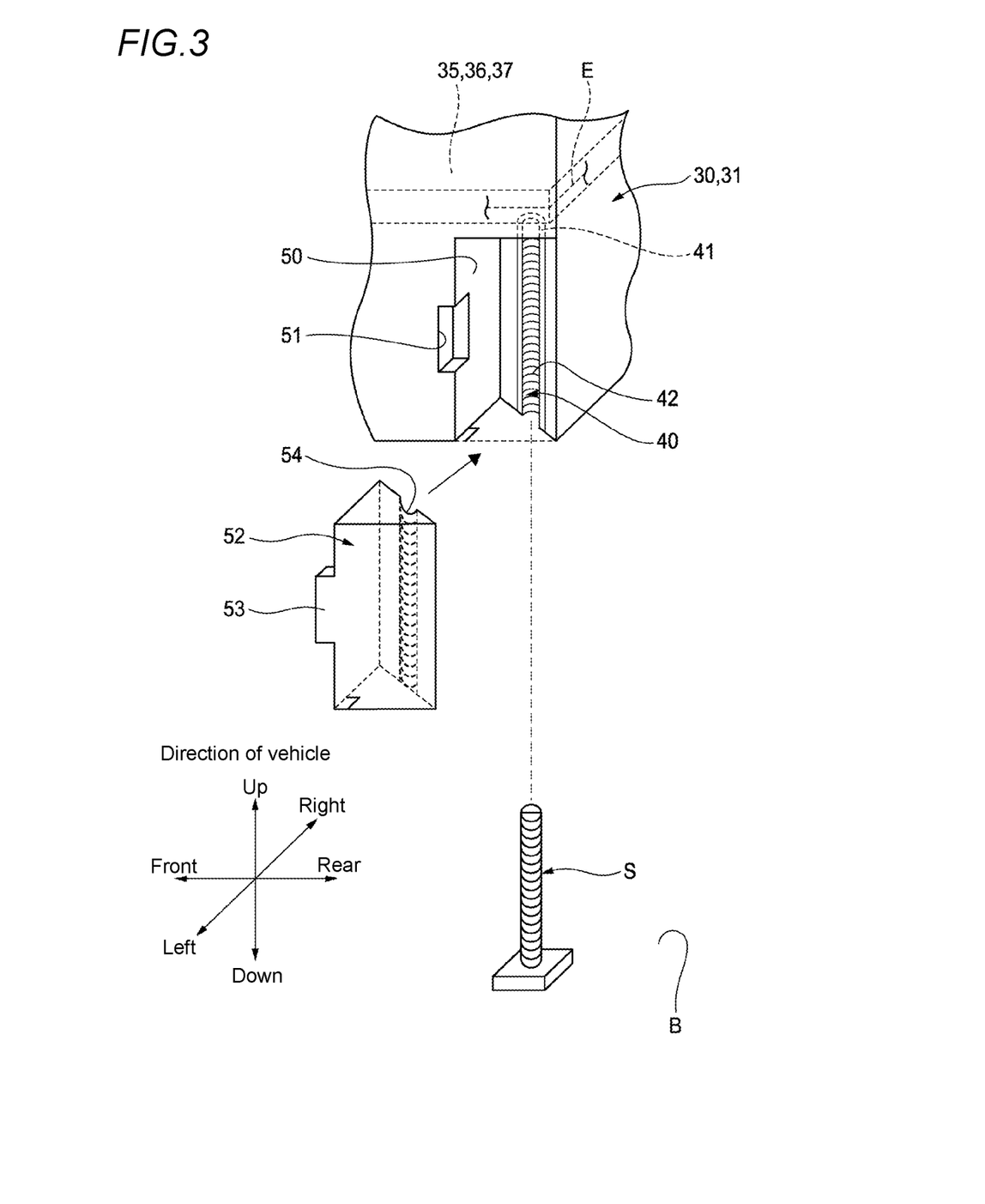
FIG. 3 is an enlarged perspective view illustrating main parts of a housing of the connection unit illustrated in FIG. 1.
Figure 4:
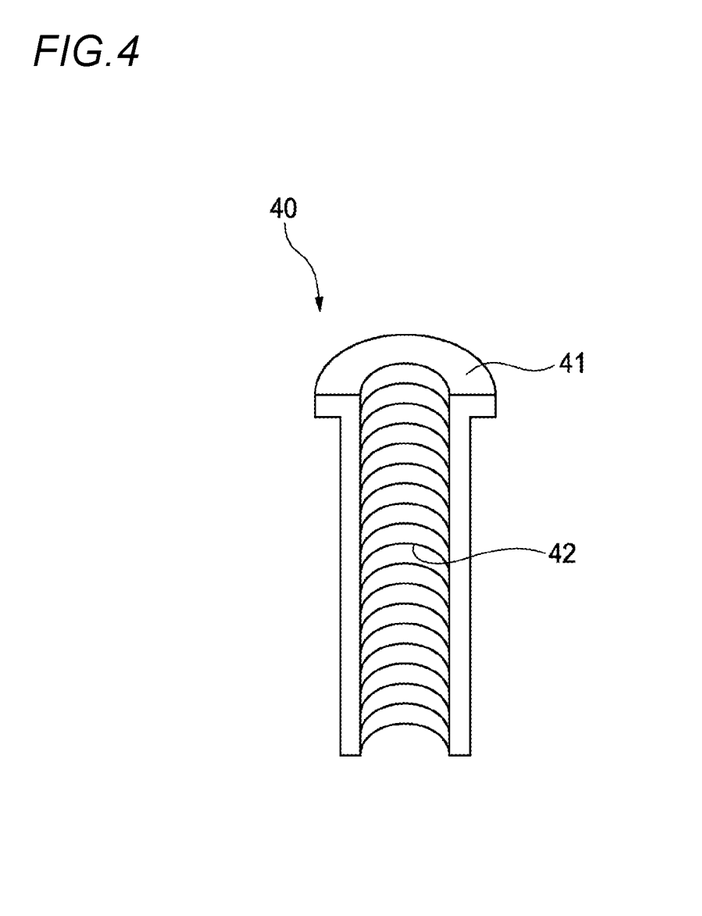
FIG. 4 is a perspective view illustrating a conductor member illustrated in FIG. 3.
Figure 5:
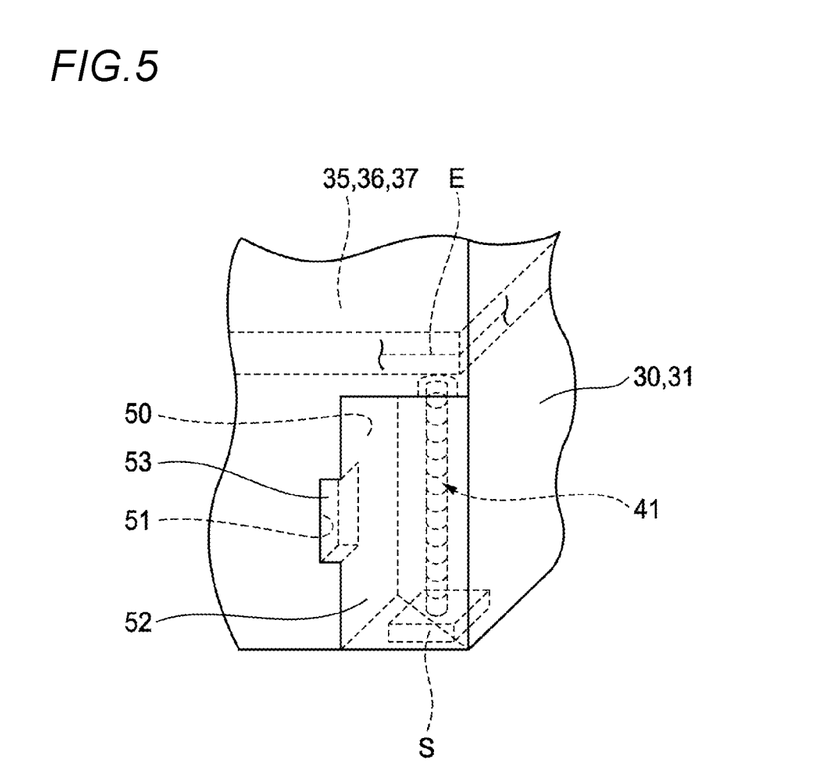
FIG. 5 is a perspective view illustrating a state where a fitting member illustrated in FIG. 3 is mounted on a hollowed portion.

A wire harness 1 according to an embodiment of the present disclosure will be described with reference to FIGS. 1 to 5. FIG. 1 is an exploded perspective view illustrating main parts of a wire harness 1 of the present embodiment. FIG. 2 is a perspective view illustrating a state where a connection unit 30 in FIG. 1 is turned upside down. FIG. 3 is an enlarged perspective view illustrating main parts of a housing 31 of the connection unit 30 illustrated in FIG. 1. FIG. 4 is a perspective view illustrating a conductor member 40 illustrated in FIG. 3. FIG. 5 is a perspective view illustrating a state where a fitting member 52 illustrated in FIG. 3 is mounted on a hollowed portion 50.

(Overall Configuration of Wire Harness)

First, an overall configuration of the wire harness 1 of the present embodiment will be described.

As illustrated in FIG. 1, the wire harness 1 of the present embodiment is mounted on a vehicle such as an automobile. The wire harness 1 includes first and second main lines 11, 12 disposed on a vehicle body B and a connection unit 30 stacked and disposed on an upper side of the first and second main lines 11, 12. A stud bolt S (grounding conductor) is erected on the vehicle body B, and the stud bolt S functions as an electrical ground connection for the vehicle.

The first main line 11 of the wire harness 1 extends in a vehicle front-rear direction on the vehicle body B. The second main line 12 of the wire harness 1 intersects the first main line 11 substantially at a right angle and extends and routes in a vehicle left-right (width) direction. That is, the wire harness 1 of the present embodiment includes an intersection portion 13 which is routed substantially in a cross shape. The first main line 11 intersects the second main line 12 at the intersection portion 13.

At the intersection portion 13 of the wire harness 1, the first and second main lines 11, 12 are provided so as not to be bulky by being braided in units of the electrical wires 21, 23 described below. The intersection portion 13 of the wire harness 1 and a peripheral thereof are wound and covered with a tape T.

A portion of the first main line 11 located at a vehicle front side is referred to as a front side portion 1A of the wire harness 1 with reference to the intersection portion 13 of the wire harness 1. Similarly, a portion thereof located at a vehicle rear side is referred to as a rear side portion 1B of the wire harness 1. A portion of the second main line 12 located at a vehicle left side is referred to as a left side portion 1C of the wire harness 1, and a portion thereof located at a vehicle right side is referred to as a right side portion 1D of the wire harness 1.

The wire harness 1 includes a standard sub-harness 20 constituted by a plurality of standard electrical wires 21, and an optional sub-harness 22 constituted by a plurality of optional electrical wires 23 (first electrical wire, second electrical wire). The standard sub-harness 20 and the optional sub-harness 22 are bundled together in each of the first and second main lines 11, 12 of the wire harness 1, and the first and second main lines 11, 12 are configured as an assembly including these sub-harnesses 20, 22.

Two optional sub-harnesses 22 are branched from the second main line 12 at the rear side portion 1B of the wire harness 1. A harness-side connector 24, which is fitted to a unit-side connector 38 of a connection unit 30 described below, is provided at a tip end portion of the optional sub-harness 22.

The harness-side connector 24 is a male connector, and is formed into a flat box shape by an electrically insulating synthetic resin or the like. The optional electrical wires 23 of the optional sub-harness 22 are connected to a lateral surface of one end of the harness-side connector 24. In addition, a plurality of conductive connection-receiving portions (not illustrated) are provided on a lateral surface of the other end which is to be fitted to the unit-side connector 38 of the connection unit 30, and the connection-receiving portions are electrically connected to the optional electrical wires 23 of the optional sub-harness 22 respectively. A ground wire 14 of the wire harness 1 is also branched in a similar manner at the rear side portion 1B of the wire harness 1, and a ground terminal 15 is provided at a tip end of the ground wire 14. The ground terminal 15 of the ground wire 14 is a round terminal including a ring shape, and is electrically grounded by inserting the stud bolt S into an inside of the ring shape thereof.

The connection unit 30 includes a substantially box-shaped housing 31 and a circuit board 35 accommodated inside the housing 31. The housing 31 is formed of an electrically insulating synthetic resin or the like, and a lid 32 is detachably provided on a surface thereof. Maintenance or replacement can be appropriately performed on the circuit board 35 inside the housing 31 by removing the lid 32. Two fitting holes 33 are formed side by side on the vehicle rear-side lateral surface of the connection unit 30 in the vehicle left-right direction, and the unit-side connectors 38 are respectively fitted into the fitting holes 33 so as not to be exposed to the outside.

The unit-side connector 38 is formed into a substantially box shape by an electrically insulating synthetic resin or the like, and a lateral surface of the other end of the unit-side connector 38 is formed to be open to the vehicle rear side, so that a plurality of conductive connection portions 39 are exposed. When the harness-side connector 24 of the optional sub-harness 22 is fitted to the unit-side connector 38 of the connection unit 30, the connection portion 39 of the unit-side connector 38 is electrically connected to the connection-receiving portion of the harness-side connector 24.

Next, the configuration of components will be further described.

<Configuration of Standard Sub-Harness and Optional Sub-Harness>

Next, the configurations of the standard sub-harness 20 and the optional sub-harness 22 will be further described.

As illustrated in FIG. 1, the standard sub-harness 20 includes a plurality of standard electrical wires 21. The optional sub-harness 22 includes a plurality of optional electrical wires 23. At least one of the plurality of standard electrical wires 21 and optional electrical wires 23 is an electrical wire for supplying power, and at least another one is a ground wire for grounding, and at least more another one is a signal line or a communication line for transmitting a signal.

The standard electrical wires 21 and the optional electrical wires 23 are obtained by covering a periphery of a conductor such as a stranded wire with an electrically insulating synthetic resin or the like. A thickness of the conductor of the standard electrical wires 21, a thickness of the covering, and a material thereof are determined according to a current value and a voltage value which are changed depending on specifications such as vehicle type and vehicle grade. In addition, a length or the like of the optional electrical wire 23 is determined according to the specification of the optional sub-harness 22.

Many of the standard electrical wires 21 relate to basic functions of a vehicle, for example, a driving system such as an engine and a motor, and are electrical wires which are mounted on all the vehicles in a standard manner. On the other hand, many of the optional wires 23 relate to additional (optional) functions of a vehicle, such as a sound system and a power window system, and are electrical wires which are to be mounted selectively and additionally in accordance with a request from a vehicle customer (driver).

<Configuration of Connection Unit>

Next, the configuration of the connection unit will be further described.

As illustrated in FIGS. 1 and 2, the connection unit 30 is formed into a box shape, and accommodates the circuit board 35 therein. Specifically, the connection unit 30 includes the substantially box-shaped housing 31 and the circuit board 35 accommodated inside the housing 31. In the connection unit 30, an optional electrical wire 23 (first electrical wire) of one optional sub-harness 22 is connected to an optional electrical wire 23 (second electrical wire) of the other optional sub-harness 22 via the circuit board 35. In addition, the connection unit 30 is stacked on the intersection portion 13 of the main lines 11, 12 of the wire harness 1.

A circuit network 37 is provided on the circuit board 35. Specifically, the circuit board 35 includes an electrically insulating substrate body 36, and the circuit network 37 is formed as a printed circuit board (print pattern) on the substrate body 36. The circuit network 37 constitutes a part of electrical wires for selectively providing additional specifications to the wire harness 1. When a relatively complex network 37 is to be formed, a multilayer printed circuit board is used to form the relatively complex circuit network 37 on the substrate body 36 of the circuit board 35. In addition, the two unit-side connectors 38 are disposed on the circuit board 35, and the unit-side connectors 38 face the outside through the fitting holes 33 of the housing 31.

The circuit network 37 is formed as a wiring pattern, of conductive foil such as copper foil, attached to a front surface, a back surface, or an interface of layers in a thickness direction of the substrate body 36 of the circuit substrate 35. That is, the circuit network 37 includes a plurality of wirings in the wiring pattern, and is electrically connected to the lateral surface of one end of the unit-side connector 38 through the wiring of the circuit network 37. That is, the unit-side connectors 38 are connected to the circuit network 37 of the circuit board 35 via the connection portions 39. The two unit-side connectors 38 are also partially or entirely connected to each other through the wiring of the circuit network 37.

The plurality of wirings are electrically separated from one another. Alternatively, a part of the wirings are electrically connected to each other. When the plurality of wirings are separated at intersection positions in a plane, the wirings are disposed on different planes or layers so as to be electrically separated. When wirings disposed on different surfaces or layers are connected to each other, the substrate body 36 of the circuit board 35 is electrically connected by using a through hole penetrating in the thickness direction. As described above, connection or disconnection of the optional electrical wires 23 of the optional sub-harnesses 22 and switching of the connection such as branching of these optional electrical wires 23 can be easily realized by appropriately changing the circuit network 37 of the circuit board 35.

As illustrated in FIGS. 1 and 3, a ground pattern E for grounding is formed on the circuit board 35 by the circuit network 37. A hollowed portion 50 with a triangular column shape is formed, in a length direction of the housing 31, on a lateral wall facing the vehicle body B when the connection unit 30 is disposed on the vehicle body B in the housing 31 of the connection unit 30, that is, a back surface of the housing 31. A conductor member 40 extending downward from the circuit board 35 is provided, and a part of the conductor member 40 is fixed to one lateral surface of the hollowed portion 50 in an embedded state. At this time, the conductor member 40 is electrically connected to the ground pattern E on the circuit board 35. A fitting member 52, which is formed to fill the hollowed portion 50, is provided on the housing 31 of the connection unit 30.

As illustrated in FIGS. 1 and 2, a housing groove 34 for accommodating the intersection portion 13 of the wire harness 1 and the peripheral portion thereof is formed into a substantially cross shape on a back surface of the housing 31 of the connection unit 30. A cross section of the housing groove 34 is formed into an arc shape with a predetermined gap space relative to a cross-sectional outer shape of the first and second main lines 11, 12.

The cross section of the housing groove 34 of the housing 31 may be formed substantially into a C shape such that a width of an opening of the housing groove 34 is smaller than a diameter of the arc. In this case, the first and second main lines 11, 12 can be stably held in the housing groove 34.

<Configuration of Conductor Member, Hollowed Portion and Fitting Member>

Next, the configuration of each of the conductor member 40, the hollowed portion 50, and the fitting member 52 will be further described.

As illustrated in FIGS. 1 and 3, the connection unit 30 includes the hollowed portion 50 and the fitting member 52. As described above, a part of the conductor member 40 is disposed on the hollowed portion 50 in an embedded state. The conductor member 40, the hollowed portion 50, and the fitting member 52 are formed at one corner of a lateral wall facing the vehicle body B, that is, a back surface of the housing 31, when the connection unit 30 is disposed on the vehicle body B.

As described above, the hollowed portion 50 is formed into a triangular column shape, and the cross section thereof is formed into an equilateral triangle. The hollowed portion 50 is formed by being cut out from one lateral surface to the back surface of the housing 31 of the connection unit 30, and a right angle portion of the triangular column shape is disposed adjacent to the lateral surface of the housing. At the right angle portion of the hollowed portion 50, an engagement concave portion 51 (engagement portion), which is obtained by digging out a part of the edge portion thereof, is formed in the middle of an edge portion extending in the height direction.

As illustrated in FIG. 4, the conductor member 40 is formed of a conductive rod-shaped metal member, specifically, formed into a semi-cylindrical shape which is divided into two parts along an axial direction, and an arc-shaped flange 41 is provided at a tip end of the conductive member 40. The flange 41 contacts the circuit board 35 at an end surface of the flange 41 and conducts to the ground pattern E on the circuit board 35 (see FIG. 3). A thread groove 42 corresponding to a thread groove of the stud bolt S is formed on an inner circumferential surface of the conductor member

40. In the hollowed portion 50 of the connection unit 30, the conductor member 40 is fixed to one lateral surface of the hollowed portion 50 inclined relative to another one lateral surface of the housing 31 such that an axial direction of the conductor member 40 extends along the height direction of the housing 31. At this time, the conductor member 40 is disposed such that the flange 41 of the conductor member 40 is located on the upper side and the thread groove 42 of the conductor member 40 is exposed to the outside.

As illustrated in FIGS. 1 and 3, the fitting member 52 is formed of an electrically insulating synthetic resin or the like, and is used to fill the hollowed portion 50. Specifically, the fitting member 52 is formed into a triangular prism shape similarly to the hollowed portion 50, and a cross section thereof is formed into an isosceles right-angled triangles. A thread groove 54 is formed on one lateral surface of the fitting member along the height direction corresponding to the lateral surface of the hollowed portion 50 inclined relative to another lateral surface of the housing 31. When the fitting member 52 is mounted on the hollowed portion 50, the thread groove 42 of the conductor member 40 and the thread groove 54 of the fitting member 52 clamp and come into contact with the stud bolt S of the vehicle body B.

An engagement convex portion (engagement portion) 53, which is obtained by allowing a part of an edge portion to protrude, is formed in the middle of the edge portion extending in the height direction at a right angle portion of the fitting member 52. That is, the engagement convex portion 53 of the fitting member 52 and the engagement concave portion 51 of the hollowed portion 50 are formed into shapes corresponding to each other. Therefore, when the fitting member 52 is mounted on the hollowed portion 50, the hollowed portion 50 and the fitting member 52 are engaged with each other to include each of the engagement portion 51 of the hollowed portion 50 and the engagement portion 53 of the fitting member 52. By this engagement, relative movement between the hollowed portion 50 and the fitting member 52 is restricted.

<Installation of Wire Harness>

Next, the installation of the wire harness 1 will be further described.

In the wire harness 1 configured as described above, the harness-side connector 24 of the optional sub-harness 22 branched from the second main line 12 of the wire harness 1 is fitted to the unit-side connector 38 of the connection unit 30. The optional electrical wires 23 of the optional sub-harness 22 are connected to the circuit network 37 of the circuit board 35 by this fitting. In addition, when the housing 31 of the connection unit 30 is stacked and installed so as to cover the intersection portion 13 of the wire harness 1 and the periphery thereof, a part of the first and second main lines 11, 12 are accommodated in the housing groove 34 of the housing 31. As a result, the housing 31 of the connection unit 30 is stably supported by surface-contact with the vehicle body B at a portion other than the housing groove 34 while avoiding the first and second main lines 11, 12 on the back surface thereof.

Further, as illustrated in FIG. 5, when the connection unit 30 is installed on the vehicle body B, the conductor member 40 disposed on the hollowed portion 50 comes into contact with the stud bolt S of the vehicle body B in a radial direction thereof. Then, the fitting member 52 is mounted on the hollowed portion 50 under this contact state between the conductor member 40 and the stud bolt S, and the connection unit 30 can be attached to the vehicle body B by this mounting. At this time, the hollowed portion 50 is engaged with the fitting member 52, and the engagement concave portion 51 of the hollowed portion 50 and the engagement convex portion 53 of the fitting member 52 are engaged with each other. In this way, the circuit board 35 of the connection unit 30 is grounded as it is via the conductor member 40.

<Advantages of Wire Harness of Present Embodiment>

As described above, according to the wire harness 1 of the present embodiment, the connection unit 30 is provided with the conductor member 40 extending downward from the circuit board 35. When the connection unit 30 is installed on the vehicle body B, the conductor member 40 is in contact with and electrically connected to the stud bolt S (grounding conductor) of the vehicle body B. Therefore, the circuit board 35 can be directly connected to the ground as it is via the conductor member 40 only by disposing the connection unit 30 on the vehicle body B. Therefore, even when a large number of the connection units 30 including the circuit board 35 are required to be disposed, the work of connecting the circuit board 35 to the ground can be simplified and the assembling efficiency of the wire harness 1 can be improved.

According to the wire harness 1 of the present embodiment, the connection unit 30 includes the hollowed portion 50 and the fitting member 52 to be mounted on the hollowed portion 50 so as to fill the hollowed portion 50, and a part of the conductor member 40 is disposed on the hollowed portion 50. Therefore, when the connection unit 30 is disposed, the fitting member 52 of the connection unit 30 is mounted on the hollowed portion 50 so as to mount the connection unit 30 on the vehicle body B. Therefore, the contact state between the stud bolt S (grounding conductor) of the vehicle body B and the conductor member 40 is firmly maintained, and the circuit board 35 is connected to the ground more reliably, and the grounding connection state can be maintained firmly even when the vehicle body is vibrated.

According to the wire harness 1 of the present embodiment, the connection unit 30 has a box shape, and accommodates the circuit board 35 therein. The conductor member 40, the hollowed portion 50, and the fitting member 52 are formed at one corner of the lateral wall of the connection unit 30 facing the vehicle body B during the installation. Therefore, alignment of the connection unit 30 with the stud bolt S (grounding conductor) of the vehicle body B with in the installation work of the connection unit 30 is facilitated. As a result, the assembling efficiency of the wire harness 1 can be improved.

According to the wire harness 1 of the present embodiment, the hollowed portion 50 and the fitting member 52 are respectively provided with engagement portions 51, 53 having shapes corresponding to each other, and the fitting member 52 is mounted on the lightening portion 50. At this time, the hollowed portion 50 is engaged with the fitting member 52, and the engagement portion 51 of the hollowed portion 50 and the engagement portion 53 of the fitting member 52 are engaged with each other, so that the fitting member 52 can be firmly fixed to the hollowed portion 50 by restricting relative movement through the engagement portions 51 and 53. Therefore, the work of connecting the circuit board 35 to the ground can be performed more simply and reliably.

According to the wire harness 1 of the present embodiment, the conductor member 40 is formed to have a rod shape, the flange 41 is provided at a tip end of the conductor member 40, and an end surface of the flange is in contact with the circuit board 35 such that the conductor member is electrically connected to the ground pattern E on the circuit board 35. Therefore, the circuit board 35 and the conductor member 40 can be more reliably brought into contact with each other, and the work of connecting the circuit board 35 to the ground can be performed more simply and reliably.

In the present embodiment, the conductor member 40, the hollowed portion 50, and the fitting member 52 are formed at one corner of the back surface of the housing 31. The conductor member 40, the hollowed portion 50, and the fitting member 52 may be formed at a plurality of corners of the back surface of the housing 31. At this time, when the stud bolt S exists at a position corresponding to each of the conductor member 40, the hollowed portion 50, and the fitting member 52, the connection unit 30 can be more firmly fixed to the stud bolt S.

Although the description of the specific embodiments is completed above, aspects of the present disclosure are not limited to these embodiments, and may be appropriately modified, improved, or the like.

According to an aspect of the present disclosure, a wire harness (1) includes at least two electrical wires (one of selection electrical wire and the other of selection electrical wire, 23), and a connection unit (30) via which each of the at least two electrical wires (one of selection electrical wire and the other of selection electrical wire, 23) are connected. The connection unit (30) includes a circuit board (35) connected to the at least two electrical wires (one of selection electrical wire and the other of selection electrical wire, 23), and a conductor member (40) extending downward from the circuit board (35), the conductor member (40) being electrically connected to a ground pattern (E) on the circuit board (35). The connection unit (30) is attached to a vehicle body (B) in a state where the conductor member (40) is in contact with a grounding conductor (stud bolt, S) formed on the vehicle body (B) when the connection unit (30) is disposed on the vehicle body (B).

According to the aspect of the present disclosure, the connection unit (30) further includes a hollowed portion (50) formed on a lateral wall, facing the vehicle body (B) when the connection unit (30) is disposed on the vehicle body (B), and a fitting member (52) mounted on the hollowed portion (50) to fill the hollowed portion (50). A part of the conductor member (40) is disposed on the hollowed portion (50). The fitting member (52) is mounted on the hollowed portion (50) such that the connection unit (30) is attached to the vehicle body (B) in a state where the conductor member (40) is in contact with the grounding conductor (stud bolt, S) formed on the vehicle body (B) when the connection unit (30) is disposed on the vehicle body (B).

According to the aspect of the present disclosure, the connection unit (30) has a box shape in which the circuit board (35) is accommodated. The conductor member (40), the hollowed portion (50), and the fitting member (52) are formed on at least one corner of the lateral wall of the connection unit (30).

According to the aspect of the present disclosure, engagement portions (an engagement concave portion (51) and an engagement convex portion (53)) having shapes corresponding to each other are provided on the hollowed portion (50) and the fitting member (52) respectively. The fitting member (52) is mounted on the hollowed portion (50) such that the hollowed portion (50) is engaged with the fitting member (52), and the engagement portions (the engagement concave portion (51) and the engagement convex portion (53)) of the fitting member (52) and the hollowed portion (50) are engaged with each other.

According to the aspect of the present disclosure, the conductor member (40) is formed to have a rod shape. A flange (41) is provided on a tip end of the conductor member (40), and an end surface of the flange is in contact with the circuit board (35) such that the conductor member (40) is electrically connected to the ground pattern (E) on the circuit board (35).

According to the aspect of the present disclosure, the conductor member extending downward from the circuit board is provided in the connection unit, and is in contact with and electrically connected to the grounding conductor of the vehicle body when the connection unit is disposed on the vehicle body. Therefore, the circuit board can be directly connected to the ground via the conductor member only by disposing the connection unit on the vehicle body. Accordingly, even when a large number of connection units including a circuit board are required to be disposed, the work of connecting the circuit board to the ground can be simplified and the assembling efficiency of the wire harness can be improved.

According to the aspect of the present disclosure, the connection unit includes the hollowed portion and the fitting member to be mounted on the hollowed portion to fill the hollowed portion, and a part of the conductor member is disposed at the hollowed portion. Therefore, when the connection unit is disposed, the fitting member of the connection unit is attached to the hollowed portion so as to mount the connection unit on the vehicle body. Accordingly, the contact state between the grounding conductor of the vehicle body and the conductor member can be maintained firmly, the circuit board can be connected to the ground more reliably, and the connection state of the ground connection can be maintained firmly even when the vehicle body is vibrated.

According to the aspect of the present disclosure, the conductor member, the hollowed portion, and the fitting member are formed on at least one corner of the lateral wall, facing the vehicle body when the connection unit is disposed, so that alignment of the connection unit relative to the grounding conductor of the vehicle body in the installation work of the connection unit is facilitated, and the assembling efficiency of the wire harness is improved.

According to the aspect of the present disclosure, when the fitting member is mounted to the hollowed portion, the hollowed portion is engaged with the fitting member, and the engagement portions of the fitting member and the hollowed portion are engaged with each other, so that the fitting member can be firmly fixed to the hollowed portion by restricting the relative movement by the engagement portions thereof. Therefore, the work of connecting the circuit board to the ground can be performed more simply and reliably.

According to the aspect of the present disclosure, the flange is provided on a tip end of the conductor member, and an end surface of the flange is in contact with the circuit board such that the conductor member is electrically connected to the ground pattern on the circuit board. As a result, the contact between the circuit board and the conductor member can be more reliable, and the work of connecting the circuit board to the ground can be performed more simply and reliably.

REFERENCE SIGNS LIST

1 Wire harness
1A Front side portion
1B Rear side portion
1C Left side portion
1D Right side portion
11 First main line
12 Second main line 13 Intersection portion
14 Ground wire
15 Ground terminal
20 Standard sub harness
21 Standard electrical wire
22 Optional sub harness
23 Optional electrical wire (First electrical wire, second electrical wire)
24 Harness-side connector
30 Connection unit
31 Housing
32 Lid
33 Fitting hole
34 Housing groove
35 Circuit board
36 Substrate body
37 Circuit network
38 Unit-side connector
39 Connection portion
40 Conductor member
41 Flange
42 Thread groove
50 Hollowed portion
51 Engagement concave portion (Engagement portion)
52 Fitting member
53 Engagement convex portion (Engagement portion)
54 Thread groove
T Tape
B Vehicle body
S Stud bolt (Grounding conductor)
E Ground pattern

What is claimed is:

1. A wire harness comprising:
   at least two electrical wires; and
   a connection unit via which each of the at least two electrical wires are connected,
   wherein the connection unit includes:
      a circuit board connected to the at least two electrical wires; and
      a conductor member extending downward from the circuit board, the conductor member being electrically connected to a ground pattern on the circuit board, and
   wherein the connection unit is attached to a vehicle body in a state where the conductor member is in contact with a grounding conductor formed on the vehicle body when the connection unit is disposed on the vehicle body.

2. The wire harness according to claim 1,
   wherein the connection unit further includes:
      a hollowed portion formed on a lateral wall, facing the vehicle body when the connection unit is disposed on the vehicle body; and
      a fitting member mounted on the hollowed portion to fill the hollowed portion,
   wherein a part of the conductor member is disposed on the hollowed portion, and
   wherein the fitting member is mounted on the hollowed portion such that the connection unit is attached to the vehicle body in a state where the conductor member is in contact with the grounding conductor formed on the vehicle body when the connection unit is disposed on the vehicle body.

3. The wire harness according to claim 2,
   wherein the connection unit has a box shape in which the circuit board is accommodated, and
   wherein the conductor member, the hollowed portion, and the fitting member are formed on at least one corner of the lateral wall of the connection unit.

4. The wire harness according to claim 2,
   wherein engagement portions having shapes corresponding to each other are provided on the hollowed portion and the fitting member respectively, and
   wherein the fitting member is mounted on the hollowed portion such that the hollowed portion is engaged with the fitting member, and the engagement portions of the fitting member and the hollowed portion are engaged with each other.

5. The wire harness according to claim 1,
   wherein the conductor member is formed to have a rod shape,
   wherein a flange is provided on a tip end of the conductor member, and
   wherein an end surface of the flange is in contact with the circuit board such that the conductor member is electrically connected to the ground pattern on the circuit board.

* * * * *